April 7, 1931.   V. J. BURNELLI   1,799,779
MUFFLER AND HEATING MEANS
Filed Dec. 31, 1928    2 Sheets-Sheet 1
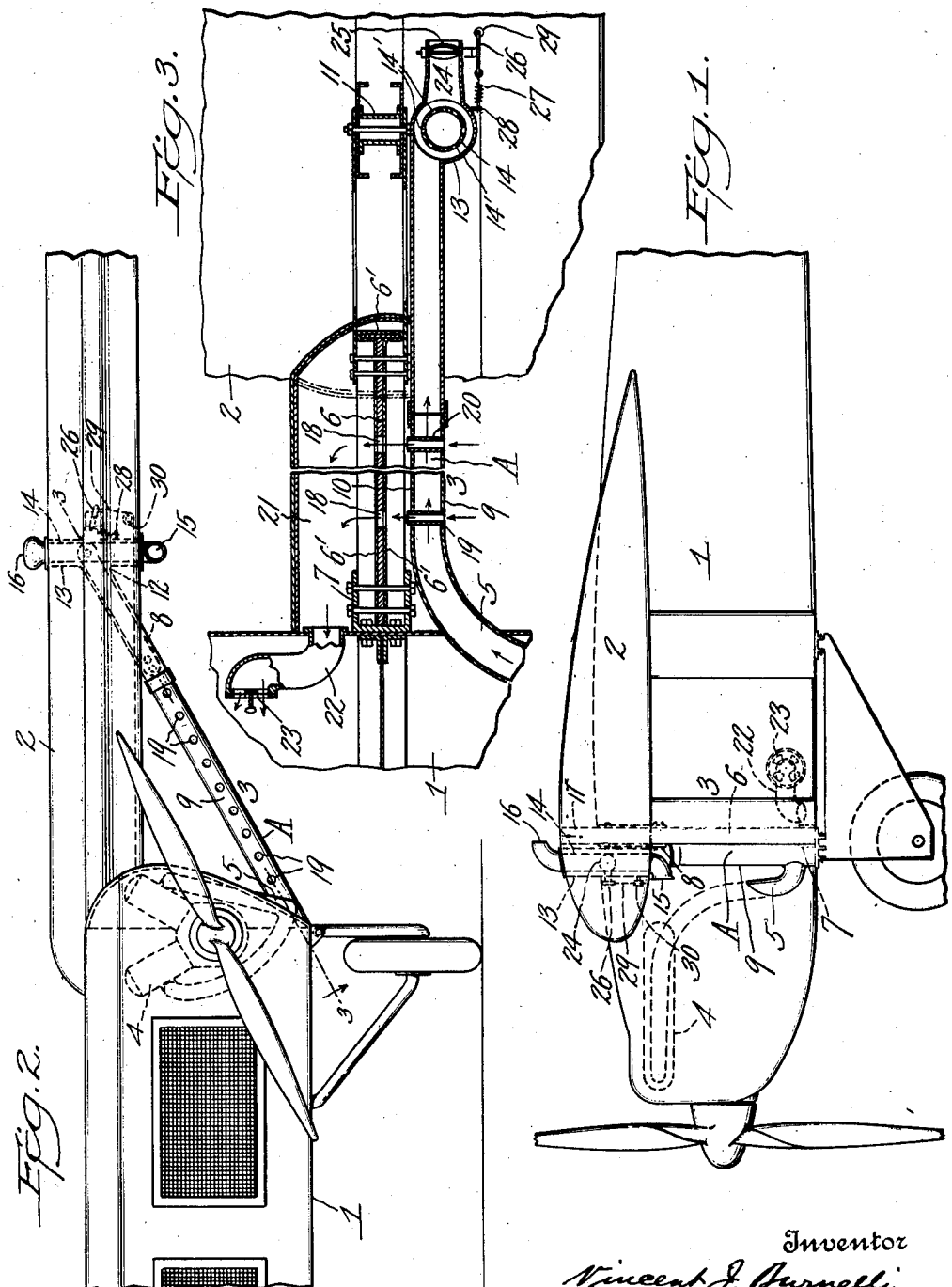
Inventor
Vincent J. Burnelli
By his Attorney
Frederick W. Barker April 7, 1931. V. J. BURNELLI 1,799,779
MUFFLER AND HEATING MEANS
Filed Dec. 31, 1928 2 Sheets-Sheet 2
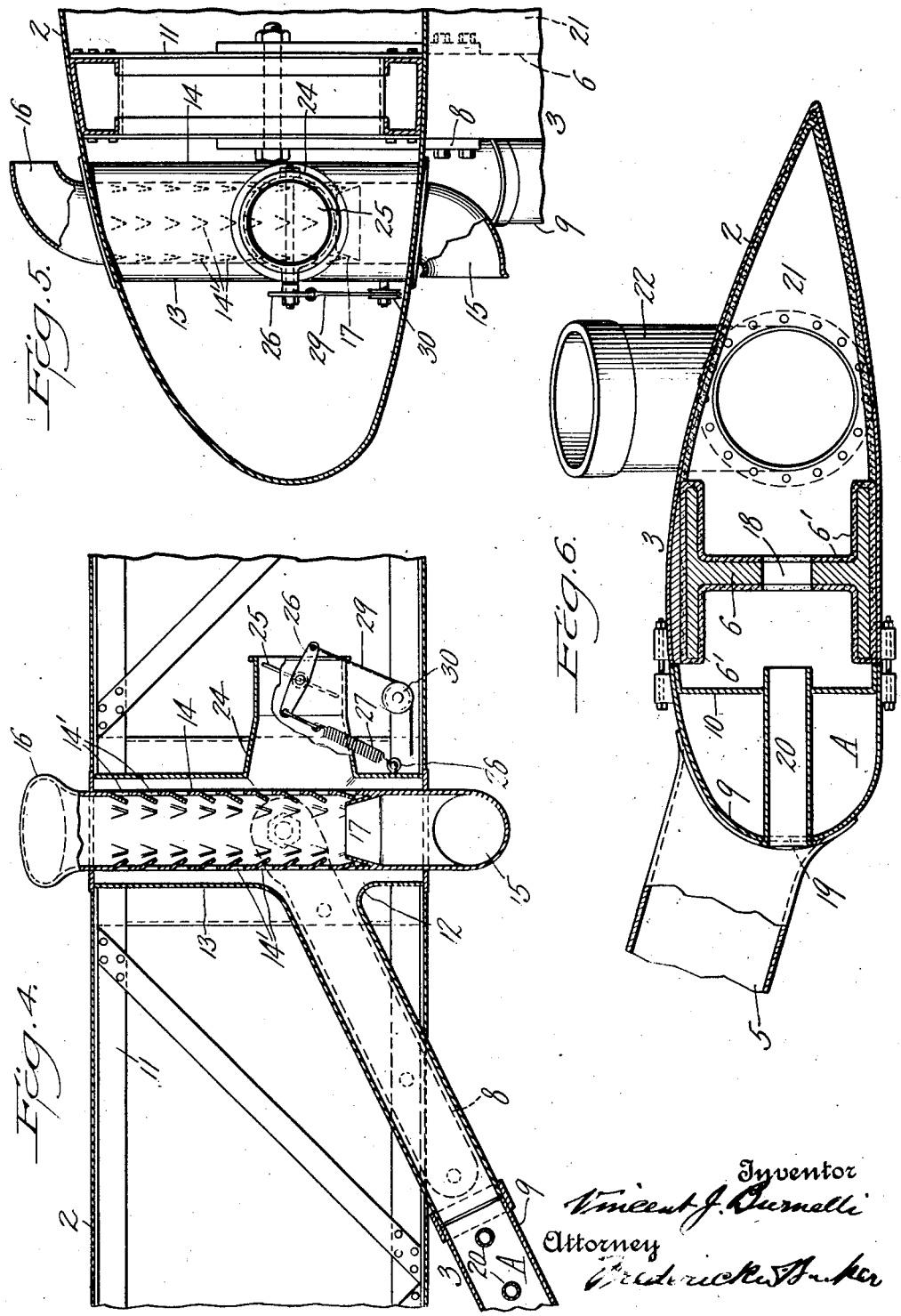

Patented Apr. 7, 1931

1,799,779

UNITED STATES PATENT OFFICE

VINCENT J. BURNELLI, OF NEW YORK, N. Y., ASSIGNOR, BY DIRECT AND MESNE ASSIGNMENTS, TO THE UPPERCU-BURNELLI CORPORATION, A CORPORATION OF DELAWARE

MUFFLER AND HEATING MEANS

Application filed December 31, 1928. Serial No. 329,440.

This invention relates to airplanes and it comprises certain improved means for muffling the engine exhaust, means for exchange of heat between fresh air and the exhaust gases, means for employing the heated air to raise the temperature of the airplane interior, and means providing for the final discharge of the exhaust gases in the rarified region above a supporting airfoil.

As a feature of the means for more efficiently silencing the engine exhaust, I provide an extended path of travel for the burnt gases in the form of a conduit that leads from the manifold and is extended along the leading edge of a strut connecting the fuselage with a supporting airfoil. The exhaust gases are carried off through a passage in the airfoil, for discharge rearwardly thereover, a current of air flowing through an inner apertured pipe exercising suction to draw the exhaust gases into its stream, thereby diluting and cooling these gases prior to their discharge.

Also controlled means are provided for admitting exhaust gases from the conduit in the airfoil into the leading edge of said airfoil, to heat the latter and thereby prevent the formation of ice upon the exterior surface thereof.

Also the leading edge of the strut aforesaid contains tubes that penetrate the exhaust conduit to be subject to the heat thereof, and communicate with the interior of the strut fairing, said tubes being open to the atmosphere and disposed axially in the line of flight; and controlled means of communication from the fairing to the fuselage-interior are provided whereby the heated air may be applied to cabin heating purposes.

Other features and advantages of my invention will hereinafter appear.

In the drawings:

Figure 1 is a partial side elevation of an airplane embodying the features of my invention.

Fig. 2 is a partial front elevation thereof.

Fig. 3 is a sectional view taken on the line 3—3 of Fig. 2.

Fig. 4 is an enlarged longitudinal, vertical section of a supporting airfoil, showing the exhaust chamber therein, the air tube therethrough, and associated elements.

Fig. 5 is a side sectional elevation of the same, and

Fig. 6 is a cross section of a strut on a much enlarged scale.

The improvements comprehended in this invention are herein illustrated as applied to an airplane of the Burnelli type, although it will be understood I do not intend said improvements to be limited to such use, especially where they are capable of employment with other type of airplanes.

In said drawings, let 1 indicate a fuselage, having a supporting airfoil 2 extended therefrom, and a strut 3 disposed diagonally between the fuselage and airfoil. Mounted within the fuselage nose portion is an engine 4 having an exhaust pipe 5.

The strut 3 is of composite character, being here shown as including the I-beam 6 to carry the wing load, it being suitably connected to the fuselage, as at 7, and to the airfoil 2 as at 8. The leading edge of the strut consists of a casing A having the functions of a conduit, said casing having the forward, concavo-convex portion 9 and the rearward, transverse web 10, said web serving as a partition dividing the casing from the rearward portion of the strut interior.

This casing or conduit connects at its lower end with the exhaust pipe 5, to receive the hot products of combustion from the engine. Whilst the strut per se extends only to the under surface of the airfoil, where its I-beam 6 is suitably secured to a longéron 11 forming part of said airfoil, the conduit extends diagonally into the airfoil and connects, as at 12, with a cylindrical chamber 13 that extends vertically within said airfoil, its upper and lower ends being closed. Extended concentrically within and through the chamber 13, in spaced relation therewith, is a pipe 14, whose lower end, depending below the airfoil, is forwardly curved to present its opening 15 to the pressure of air met in flight of the airplane, and whose upper end, extending above the airfoil, is rearwardly curved to direct the discharge from its outlet 16 rearwardly over the airfoil. The pipe 14 which is pierced with apertures 14' through its wall is provided with constricting means, here indicated at 17, in the manner of a Venturi tube, to accord a fall in pressure for augmenting the suction pull into said pipe through apertures 14', by the stream of air flowing therethrough, to in this manner assist the induction of exhaust gases into said pipe from the conduit A and the chamber 13 that contains said pipe.

In thus mingling the products of combustion with fresh air, the gases become diluted and their temperature lowered, all tending to effect a silencing influence upon the exhaust. Further it will be apparent that by reason of the discharge occurring over and near the upper surface of the supporting airfoil, and being directed rearwardly into the region of rarefied air resulting above an airfoil in flight, a highly efficient engine muffling system has been devised with the means set forth.

In view of the high temperatures to which the strut 3 is subjected its I-beam 6 may be coated with asbestos, indicated at 6', or other suitable material that is a non-conductor of heat. Said I-beam 6 is provided with apertures 18 through its web for a purpose now to be described. The forward casing portion 9 of conduit A is provided with a series of holes 19 in which are fitted tubes 20 that extend rearwardly across the conduit and connect with the web 10, opening therethrough. Since the tubes 20 are disposed axially in the direction of flight air flows therethrough and passes through the apertures 18 in I-beam 6 into the chamber 21 that is enclosed by the stream-lined strut casing at its rearward portion. The air thus entered into chamber 21 has become heated in its passage through conduit A, and is intended to be conveyed from chamber 21, by means of a curved pipe 22, to the interior of the fuselage, for cabin heating purposes, a register 23, or other suitable control means being provided to regulate or shut off the supply.

It has been premised that the exhaust gases may be employed to heat the interior of the airfoil leading edge to prevent the formation of ice upon the exterior thereof. For this purpose a lateral extension 24 of the chamber 14 is provided, this extension opening into or being in communication with said leading edge interior. The extension aforesaid is shown as controlled by a valve 25, provided with a cross arm 26. A spring 27, having one end connected to a fixture 28 engages one end of said cross arm to thereby hold said valve normally closed, the other end of said cross arm having a wire 29 attached thereto, said wire passing around a fixed pulley 30 and leading to a convenient position for operation by the pilot when the valve is to be opened against the tension of the spring.

Variations within the spirit and scope of my invention are equally comprehended by the foregoing disclosure.

I claim:—

1. The combination with an airplane having a fuselage, a supporting airfoil, a strut connecting said fuselage and airfoil and an internal combustion engine of a conduit extended along the forward edge of said strut in communication with the engine exhaust, a chamber extended vertically in said airfoil in communication with said conduit and means associated with said chamber for delivering the exhaust gases rearwardly over said airfoil into the region of rarified atmosphere thereabove.

2. The combination with an airplane having a fuselage, a supporting airfoil, a strut connecting said fuselage and airfoil and an internal combustion engine, of a conduit extended along the forward edge of said strut in communication with the engine exhaust, a chamber in said airfoil in communication with said conduit, a tube extended through said chamber, said tube provided with apertures in its wall to receive the gases from said chamber and having a forwardly directed air inlet below said airfoil for the reception and passage of air therethrough in commingled relation with said gases, and said tube having a rearwardly directed outlet above said airfoil for the discharge of the mingled air and gases over said airfoil into the region of rarified atmosphere above said airfoil.

3. The combination with an airplane having a fuselage, a supporting airfoil, a strut connecting said fuselage and airfoil and an internal combustion engine, of a conduit extended along the forward edge of said strut in communication with the engine exhaust, a rearward chamber enclosed by the fairing of said strut, air passageways extended through said conduit from the front thereof to said rearward chamber, and means of communication between said rearward chamber and the interior of said fuselage, to permit the passage thereinto of atmospheric air, heated in transit through said conduit.

4. The combination with an airplane having a supporting air foil, a chamber extending vertically in said airfoil, and through its lower and upper surfaces, and an internal combustion engine, of an extended passageway leading from the engine exhaust means to said chamber, and means for delivering the exhaust gases rearwardly over said airfoil into the region of rarified atmosphere thereabove.

5. The combination with an airplane having a supporting airfoil, a chamber extending vertically in said airfoil, and through its lower and upper surfaces, and an internal combustion engine, of an extended passageway leading from the engine exhaust means to said chamber, means for discharging the exhaust gases, and by-pass means for delivering a part of said exhaust gases into the interior of the leading edge of said airfoil to provide heat for preventing the formation of ice upon its exterior surface.

6. The combination in an airplane having a supporting airfoil and an internal combustion engine, of a chamber disposed vertically in said airfoil, means for conducting exhaust gases from the engine to said chamber, and a perforated tube extending through said chamber, in spaced relation therewith, said tube having a forwardly directed inlet below said airfoil and a rearwardly directed outlet above said airfoil.

Executed this 27th day of December, 1928.

VINCENT J. BURNELLI.